(12) United States Patent
Ganzel

(10) Patent No.: US 6,217,129 B1
(45) Date of Patent: Apr. 17, 2001

(54) VEHICULAR BRAKE SYSTEM WITH VEHICLE STABILITY MANAGEMENT

(75) Inventor: Blaise J. Ganzel, Ann Arbor, MI (US)

(73) Assignee: Kelsey-Hayes Company, Livonia, MI (US)

( * ) Notice: Subject to any disclaimer, the term of this patent is extended or adjusted under 35 U.S.C. 154(b) by 0 days.

(21) Appl. No.: 09/329,753

(22) Filed: Jun. 10, 1999

Related U.S. Application Data

(63) Continuation-in-part of application No. PCT/US97/23022, filed on Dec. 12, 1997.
(60) Provisional application No. 60/032,872, filed on Dec. 13, 1996.

(51) Int. Cl.[7] .................................................. B60T 8/48
(52) U.S. Cl. ..................... 303/11; 303/116.2; 303/901; 303/DIG. 11
(58) Field of Search ................... 303/10, 11, 113.2, 303/116.1, 116.2, 119.1, 119.2, 900, 901, DIG. 11

(56) References Cited

U.S. PATENT DOCUMENTS

| | | | |
|---|---|---|---|
| 4,900,105 | * | 2/1990 | Burgdorf et al. ................ 303/119 |
| 5,213,399 | * | 5/1993 | Burgdorf et al. ............. 303/116.2 |
| 5,246,280 | | 9/1993 | Sigl . |
| 5,383,718 | * | 1/1995 | Burgdorf et al. ............. 303/113.2 |
| 5,484,194 | * | 1/1996 | Reinartz et al. .............. 303/116.2 |
| 5,605,385 | * | 2/1997 | Zaviska et al. ............... 303/116.2 |
| 5,707,116 | * | 1/1998 | Tsuru et al. .................. 303/116.2 |

FOREIGN PATENT DOCUMENTS

| | | | |
|---|---|---|---|
| 41 38 027 A1 | 5/1993 | (DE) | ............................. 303/116.2 |
| 2 119 883 | 11/1983 | (GB) . | |
| 06255467 | 9/1994 | (JP) . | |
| WO 91/06454 | 5/1991 | (WO) . | |
| WO 91/18776 | 12/1991 | (WO) . | |
| WO 96/02409 | 2/1996 | (WO) . | |

* cited by examiner

Primary Examiner—Matthew C. Graham
(74) Attorney, Agent, or Firm—MacMillan, Sobanski & Todd, LLC

(57) ABSTRACT

A vehicular brake system having vehicle stability management includes a hydraulic master cylinder connected to wheel brakes via brake conduits. A pump generates fluid pressures and pressure control valves located between the master cylinder and the wheel brakes regulate the fluid pressures at the wheel brakes to achieve ABS and traction control. A medium pressure accumulator stores fluid pressurized by the pump which is supplied to the wheel brakes via associated control valves to achieve VSM braking control. The brake system has low power requirements because the medium pressure accumulator does not have to be filled quickly, yet the stored pressurized fluid can be released to the wheel brakes to quickly produce the braking pressures necessary for initiating most VSM applications. The pump is used to supplement the accumulator pressures to achieve full VSM control.

8 Claims, 3 Drawing Sheets

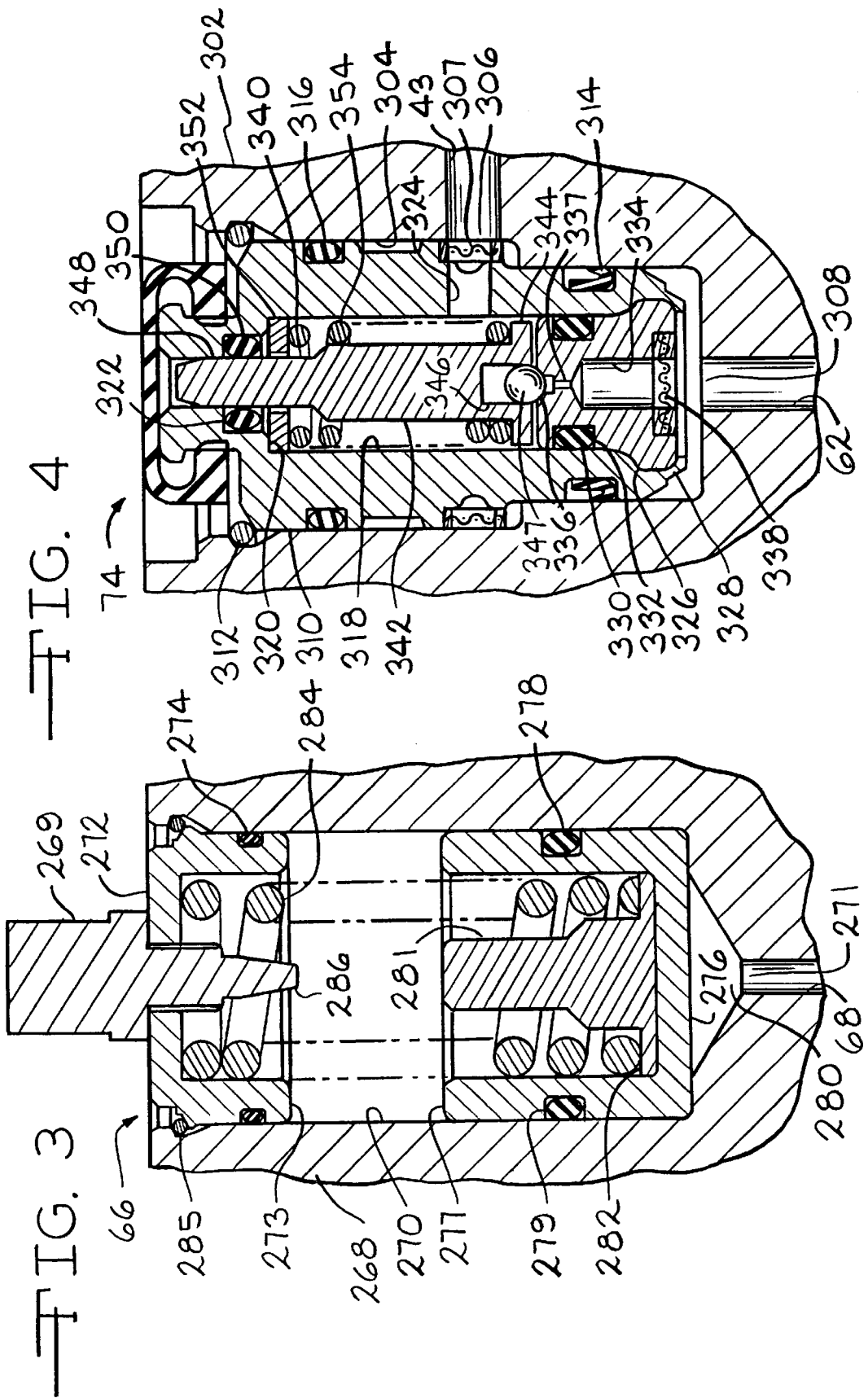

VEHICULAR BRAKE SYSTEM WITH VEHICLE STABILITY MANAGEMENT

CROSS REFERENCE TO RELATED APPLICATION

This claims the benefit of U.S. provisional patent application identified as application No. 60/032,872, filed Dec. 13, 1996, and a CIP of PCT/US97/23022, filed Dec. 12, 1997.

BACKGROUND OF THE INVENTION

This invention relates in general to a vehicular brake system. In particular, this invention relates to a vehicle stability management (VSM) system for use in an anti-lock brake (ABS) and traction control (TC) brake system.

Vehicles are commonly slowed and stopped with hydraulic brake systems. While these systems vary in complexity, a typical base brake system includes a tandem master cylinder, fluid conduit arranged in two similar but separate brake circuits, and wheel brakes in each circuit. The master cylinder generates hydraulic forces in both brake circuits by pressurizing brake fluid when the driver steps on the brake pedal. The pressurized fluid travels through the fluid conduit in both circuits to actuate brake cylinders at the wheels and slow the vehicle.

Braking a vehicle in a controlled manner under adverse conditions requires precise application of the brakes by the driver. Under these conditions, a driver can easily apply excessive brake pressure thus causing one or more wheels to lock, resulting in excessive slippage between the wheel and road surface. Such wheel lock-up conditions can lead to greater stopping distances and possible loss of directional control.

Advances in braking technology have led to the introduction of ABS systems. An ABS system monitors wheel rotational behavior and selectively applies and relieves brake pressure in the corresponding wheel brakes in order to maintain the wheel speed within a selected slip range while achieving maximum braking forces. While such systems are typically adapted to control the braking of each braked wheel of the vehicle, some systems have been developed for controlling the braking of only a portion of the braked wheels.

Electronically controlled ABS valves, comprising apply (isolation) valves and dump valves, are located between the master cylinder and the wheel brakes and perform the pressure regulation. Typically, when activated, these ABS valves operate in three pressure control modes: pressure apply, pressure dump and pressure hold. The apply valves allow brake pressure into the wheel brakes to increase pressure during the apply mode, and the dump valves release pressure from the wheel cylinders during the dump mode. Wheel cylinder pressure is held constant during the hold mode.

A further development in braking technology has led to the introduction of traction control (TC) systems. Additional valves have been added to existing ABS systems to provide a brake system which controls wheel speed during acceleration. Excessive wheel speed during vehicle acceleration leads to wheel slippage and a loss of traction. An electronic control system senses this condition and automatically applies braking pressure to the wheel cylinders of the slipping wheel to reduce the slippage and increase the traction available. In order to achieve optimal vehicle acceleration, braking pressures greater than the master cylinder pressure must quickly be available when the vehicle is accelerating.

During vehicle motion such as cornering, dynamic forces are generated which can reduce vehicle stability. A VSM brake system improves the stability of the vehicle by counteracting these forces through selective brake actuation. These forces and other vehicle parameters are detected by sensors which signal an electronic control unit. The electronic control unit automatically operates pressure control devices to regulate the amount of hydraulic pressure applied to specific individual wheel brakes. In order to achieve optimum vehicle stability, brake pressures greater than the master cylinder pressure may be required in a very short time. However, a brake system that generates high pressures very quickly typically has high power requirements or uses a large high pressure accumulator.

It would be desirable to provide an ABS/TC/VSM brake system which would provide fluid pressures in excess of master cylinder pressure quickly using a low amount of power and a low amount of stored energy.

SUMMARY OF THE INVENTION

This invention relates to an improved ABS/TC/VSM vehicle brake system. The vehicle brake system includes a hydraulic master cylinder connected to wheel brakes via brake conduits. A pump generates fluid pressures and pressure control valves located between the master cylinder and the wheel brakes regulate the fluid pressures at the wheel brakes to achieve ABS and traction control. A medium pressure accumulator stores fluid pressurized by the pump which is supplied to the wheel brakes via associated control valves to achieve VSM braking control. The brake system has low power requirements because the medium pressure accumulator does not have to be filled quickly, yet the stored pressurized fluid can be released to the wheel brakes to quickly produce the braking pressures necessary for initiating most VSM applications. The pump is used to supplement the accumulator pressures to achieve full VSM control.

Various objects and advantages of this invention will become apparent to those skilled in the art from the following detailed description of the preferred embodiments, when read in light of the accompanying drawings.

BRIEF DESCRIPTION OF THE DRAWINGS

FIG. 3 is sectional view of a medium pressure accumulator illustrated schematically in the circuit FIG. 1.

FIG. 4 is sectional view of a bypass valve illustrated schematically in the circuit FIG. 1.

DETAILED DESCRIPTION OF THE PREFERRED EMBODIMENTS

Figure 1:
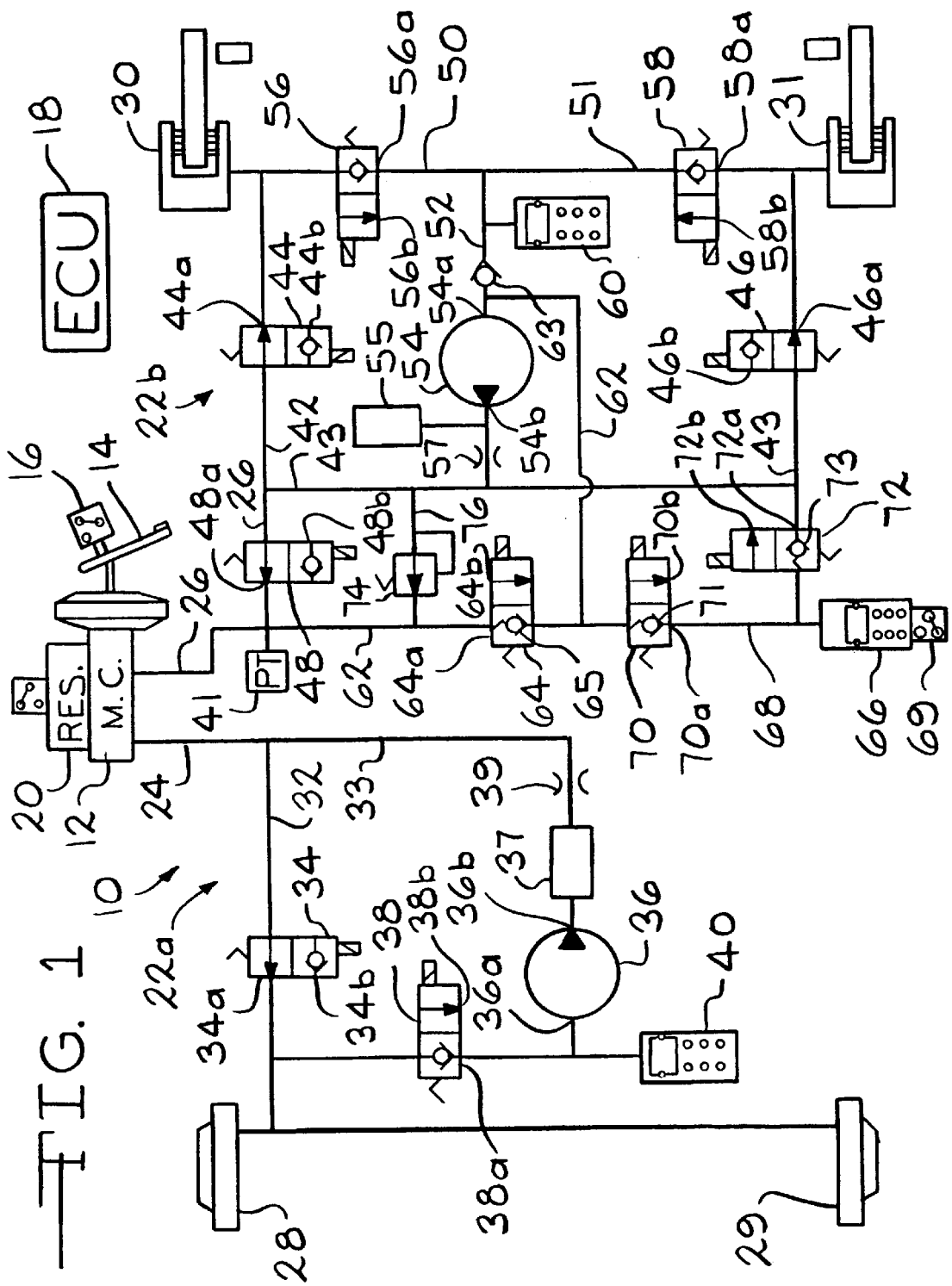
FIG. 1 is a hydraulic circuit schematic of an ABS/TC/VSM brake system with a medium pressure accumulator having two channel VSM control in accordance with this invention.

FIG. 1 illustrates an ABS/TC/VSM brake system 10 according to this invention. The brake system 10 includes a tandem master cylinder 12 for pressurizing brake fluid when the driver steps on the brake pedal 14. A brake switch 16 is connected to the Electronic Control Unit (ECU) 18 to indicate that the driver is stepping on the brake pedal 14. A reservoir 20 is connected to the master cylinder 12 and holds a supply of brake fluid at atmospheric pressure. Two separate brake circuits 22a, 22b are connected to the master cylinder 12 via main fluid conduits 24 and 26 respectively. The brake system 10 is preferably configured as a vertical split system with brake circuit 22a having first and second wheel brakes 28 and 29 connected to the master cylinder 12 via the main conduit 24 and brake circuit 22b having first and second wheels brakes 30 and 31 connected to the master cylinder 12 via main conduit 26. The brake system 10 provides ABS control to all four wheel brakes 28–31 and brake circuit 22b provides VSM and traction control to the wheel brakes 30 and 31.

In brake circuit 22a, the main conduit 24 splits into two conduits 32 and 33. A normally open solenoid actuated 2-position, 2-way ABS isolation valve 34 is located in conduit 32 between the master cylinder 12 and the wheel brakes 28 and 29. The solenoid actuated isolation valve 34 has a first, open position 34a and a second position 34b having a one-way valve which allows fluid to flow from the wheel brakes 28 and 29 towards the master cylinder 12 but prevents flow in the opposite direction. A pump 36 having an inlet 36a and an outlet 36b is located in conduit 33. A 2-position, 2-way solenoid actuated dump valve 38 is located in conduit 33 between the wheel brakes 28 and 29 and the pump inlet 36a. A damping chamber 37 and restricting orifice 39 are located at the pump outlet 36b to reduce the pressure pulsations from the pump. A low pressure accumulator (LPA) 40 is located in conduit 33 between the pump 36 and the dump valve 38. The dump valve 38 has a first, one-way position 38a which prevents fluid from flowing from the wheel brakes 28 and 29 to the LPA 40 but allows fluid to flow in the opposite direction, and a second, open position 38b allowing flow in both directions.

In circuit 22b, a master cylinder pressure transducer 41 is located in conduit 26 and is connected to the ECU 18 to indicate the master cylinder pressure. The main brake conduit 26 splits into two conduits 42 and 43. Conduit 42 is connected to the first wheel brake 30 and conduit 43 is connected to the second wheel brake 31. A first normally open solenoid actuated 2-position, 2-way ABS isolation valve 44 is located in conduit 42 between the first wheel brake 30 and the master cylinder 12. A second normally open solenoid actuated 2-position, 2-way ABS isolation valve 46 is located in conduit 43 between the second wheel brake 31 and the master cylinder 12. The ABS isolation valves 44, 46 have a first open position 44a, 46a and a second position 44b, 46b having a one-way valve which allows fluid to flow from the wheel brakes 30 and 31 towards the master cylinder 12 but prevents flow in the opposite direction. A normally open solenoid actuated 2-position, 2-way traction control isolation valve 48 is located in conduit 26 between the master cylinder 12 and the ABS isolation valves 44 and 46. The traction control isolation valve 48 has a first open position 48a, and a second position 48b having a one-way valve which allows fluid to flow from the master cylinder 12 towards the wheel brakes 30 and 31 but prevents flow in the opposite direction.

Conduits 50 and 51 connect the first and second wheel brakes 30 and 31 respectively to a conduit 52 which is connected to conduit 43. A pump 54 having an inlet 54a and an outlet 54b is located in conduit 52. A damping chamber 55 and restricting orifice 57 are located at the pump outlet 54b to reduce the pressure pulsations from the pump 54. A first 2-position, 2-way solenoid actuated dump valve 56 is located in conduit 50 between the wheel brake 30 and the connection with conduit 52. A second 2-position, 2-way solenoid actuated dump valve 58 is located in conduit 51 between the wheel brake 31 and the connection with conduit 52. A low pressure accumulator (LPA) 60 is located in conduit 52 between the pump 54 and the dump valves 56 and 58. The dump valves 56, 58 have a first, one-way position 56a, 58a which prevents fluid from flowing from the wheel brakes 30 and 31 to the LPA 60 but allows fluid to flow in the opposite direction, and a second, open position 56b, 58b allowing flow in both directions.

A supply conduit 62 is connected to the main brake conduit 26 between the traction control isolation valve 48 and the master cylinder 12. Fluid can flow from the master cylinder 12 through the main brake conduit 26 to reach the supply conduit 62 without traveling through a valve element. The supply conduit 62 is also connected to the pump inlet 54a for supplying the pump 54 with fluid. A 2-position, 2-way solenoid actuated supply valve 64 is located in the supply conduit 62 between the master cylinder 12 and the pump inlet 54a. The supply valve 64 has a first, one-way position 64a, in which a spring-loaded check valve 65 prevents fluid from flowing from the master cylinder 12 to the pump inlet 54a but allows fluid to flow in the opposite direction when the fluid reaches pressures of approximately 800 p.s.i. greater than the master cylinder pressure. The 800 p.s.i. pressure requirement may be different depending on system parameters. The supply valve 64 also has a second, open position 64b allowing flow in both directions. A one-way check valve 63 is located between the connection of the supply conduit 62 to conduit 52 and the LPA 60. The check valve 63 prevents fluid in the supply conduit 62 from flowing into the LPA 60, but allows fluid in the LPA 60 to flow towards the pump inlet 54a.

A medium pressure accumulator (MPA) 66 is located in conduit 68 which connects conduit 62 to conduit 43. The MPA 66 stores fluid at pressures which are higher than a typical low pressure accumulator but which are lower than a typical high pressure accumulator. The MPA 66 preferably stores fluid between 40 p.s.i. and 400 p.s.i., however fluid may be stored at other suitable pressures. A switch 69 on the MPA 66 is connected to the ECU 18 to indicate whether or not the MPA is full of pressurized fluid.

A first control valve in the form of a 2-position, 2-way solenoid actuated priming valve 70 is located in circuit 68 between its connection to the supply conduit 62 and the MPA 66. The priming valve 70 has a first, one-way position 70a, in which a spring-loaded check valve 71 prevents fluid from flowing from the master cylinder 12 to the MPA 66 but allows fluid to flow in the opposite direction when the fluid reaches a pressure differential of approximately 1600 p.s.i. across the valve 71. The priming valve 70 also has a second, open position 70b allowing flow in both directions.

A second control valve in the form of a 2-position, 2-way solenoid actuated charging valve 72 is located in circuit 68 between the connection with conduit 43 and the MPA 66. The charging valve 72 has a first, one-way position 72a, in which a spring-loaded check valve 73 prevents fluid from flowing from the MPA 66 towards the wheel brakes 30 and 31 but allows fluid to flow in the opposite direction when the fluid reaches a pressure differential of approximately 1600 p.s.i. across the valve. The 1600 p.s.i. pressure requirements needed to open the spring loaded check valves 71 and 73 may be different values depending on system parameters. The charging valve 72 also has a second, open position 72b allowing flow in both directions. A switchable solenoid valve is used rather than a check valve because by opening the charging valve 72 the MPA 66 can be charged by the pump 54 without creating a large load on the pump 54. Also, a solenoid valve is contamination resistant in the fully open position than a spring loaded check valve used as a relief valve.

A bypass valve 74 is connected to conduits 43 and 62 and is connected in parallel to the traction control isolation valve 48. The bypass valve 74 prevents excessive pressure buildup by opening at approximately 2500 p.s.i. to allow pressurized fluid to flow back to the master cylinder 12 when the traction control isolation valve 48 is in the second position 48*b*. The opening pressure of the bypass valve 74 should be higher than the sum of the opening pressure of the spring loaded check valve 73 in the charging valve 72 plus the MPA pressure to keep fluid taken from the MPA 66 during VSM mode in the braking system (where it will be returned to the MPA) rather than being returned to the master cylinder 12.

During normal braking the driver actuates the base braking system by pushing on the brake pedal 14 which causes the master cylinder 12 to pressurize brake fluid. In circuit 22*a*, the pressurized brake fluid travels through conduits 24 and 32, through the open ABS isolation valve 34 and into the wheel brakes 28 and 29 to brake the vehicle. In circuit 22*b*, the pressurized brake fluid travels through conduits 26, 42 and 43, through the open ABS isolation valves 44 and 46 and into the wheel brakes 30 and 31 to brake the vehicle. When the driver releases the brake pedal, the master cylinder 12 no longer pressurizes the brake fluid and the brake fluid returns to the master cylinder 12 via the same route.

During ABS modes, the driver applies the brakes in a similar manner as during normal braking. When a wheel begins to slip, the pumps 36 and 54 run and pressurize fluid in circuits 22*a* and 22*b*. The ABS isolation valves 34, 44 and 46 and the ABS dump valves 38, 56 and 58 are pulsed to control the pressures at the wheel brakes 28, 29, 30, and 31.

The MPA 66 is filled, or charged, with pressurized fluid during a charging mode. The charging mode is initiated when the MPA switch 69 indicates that the MPA 66 is not full and the brake switch 16 and master cylinder pressure transducer 41 indicate that the driver is not requesting base braking by pushing on the brake pedal 14. The traction control isolation valve 48, and the first and second ABS isolation valves 44 and 46, are shuttled to their second positions 48*b*, 44*b*, and 46*b* to prevent pressurized fluid from reaching the master cylinder 12 and wheel brakes 30 and 31. The charging valve 72 is shuttled to the second position 72*b* to open a path between the pump outlet 54*b* and the MPA 66. The supply valve 64 is shuttled to the second position 64*b* to allow fluid from the master cylinder 12 to supply the pump inlet 54*a*. The pump 54 runs and pumps pressurized fluid into the MPA 66 until the MPA switch 69 indicates that the MPA 66 is full. When the MPA 66 is full, the pump 54 is turned off and the traction control isolation valve 48, ABS isolation valves 44 and 46, supply valve 64 and charging valve 72 are returned to the first position 48*a*, 44*a*, 46*a*, 64*a* and 72*a*. The pressure of the fluid stored in the MPA 66 when it is full is approximately 400 p.s.i., although any suitable pressure can be used.

The spring loaded check valve 71 in the priming valve 70 provides a pressure relief function which prevents fluid expansion in a fully charged MPA from generating pressures capable of damaging components. For example, if the temperature of the fluid in the fully charged MPA 66 should increase, the pressure in the MPA 66 will increase. The increased pressure will open the check valve 71 and the excess fluid will flow back to the master cylinder 12 through the check valves (not shown) located in the pump 54.

The brake system 10 provides VSM control to the wheel brakes 30 and 31 using circuit 22*b* to generate the necessary fluid pressures. VSM control may be needed when the driver is applying the brakes or when the driver is not applying the brakes. Pressurized fluid stored in the MPA 66 is used to provide fluid flow rates which are greater than those available from a standard ABS/TC pump 54 to begin to fill the wheel brakes 30, 31. When VSM control is needed, the charging valve 72 is switched to the open position 72*b* and pressurized fluid flows from the MPA 66 towards the isolation valves 44 and 46 which are selectively pulsed open to allow fluid into the affected wheel 30, 31. Alternatively, the priming valve 70 could be switched to the open position 70*b* to allow pressurized fluid to flow from the MPA 66 through the pump 54 to the wheel brakes 30, 31 but this path includes restrictions which would limit the flow. When the MPA 66 has discharged to a pressure below a predetermined pressure, the charging valve 72 is switched back to the one-way position 72*a*. The priming valve 70 is switched to the open position 70*b* and the pressurized fluid still in the MPA 66 is supplied to the pump inlet 54*a* which improves the pump efficiency. The pump 54 pumps more pressurized fluid towards the wheel brakes 30, 31, and VSM braking pressures are achieved by pulsing the isolation valves 44, 46 and dump valves 56, 58 to regulate the pressures at the wheel brakes 30, 31.

The valves and pumps are preferably mounted together in a hydraulic control unit (not shown). The hydraulic control unit may be mounted in a remote location using longer conduits to connect it with the master cylinder 12. The longer conduits typically impart flow restrictions which lengthen the time required to charge the MPA 66, however, the time required to charge the MPA 66 is not critical.

During traction control or when VSM control is needed while the driver is not pushing the brake pedal the traction control isolation valve 48 is shuttled to the second position 48*b* to prevent the pressurized fluid from reaching the master cylinder 12. The first and second ABS isolation valves 44 and 46 are also shuttled to the second positions 44*b* and 46*b* to prevent pressurized fluid from reaching the wheel brakes 30 and 31. The pump 54 runs and pressurizes fluid. The ECU 18 selects the wheel to be braked and pressurized fluid is supplied to it by shuttling the charging valve 72 to the second, open position 72*b* and pulsing the corresponding ABS isolation valve 44 or 46 to the second, open position 44*b* or 46*b*. The pressurized fluid in the MPA 66 flows into the selected wheel brake 30 or 31 providing a rapid pressure increase. The charging valve 72 is shuttled back to the first position 72*a* and further pressure is applied by pulsing the priming valve 70 to the second, open position 70*b* to feed the pump inlet 54*a* with pressurized fluid from the MPA 66. The spring loaded check valve 65 in the supply valve 64 holds pressure on the pump inlet 54*a* side of the supply valve 64 so that the fluid released from the MPA 66 by the priming valve 70 will not flow back to the master cylinder 12.

The pressure at the selected wheel brake 30 or 31 is increased in a controlled manner by pulsing the corresponding ABS isolation valve 44 or 46 open and closed. The pressure is decreased in a controlled manner by pulsing open the corresponding ABS dump valve 56 and 58, allowing some of the pressurized fluid in the wheel brake 30 or 31 to flow into the LPA 60. While the ABS isolation valve 44 or 46 is pulsed closed, the pressurized fluid in the LPA 60 is pumped through the spring loaded check valve 73 in the charging valve 72 to charge the MPA 66. Therefore, the amount of fluid stored in the LPA 60 is minimized to provide adequate storage requirements in case of transition to ABS. In addition, the amount of fluid stored in the MPA 66 is maximized to reduce the need to enter the MPA charging mode.

If the driver should apply the brakes during the TC or VSM mode just described (VSM without brake apply), some pedal movement will be experienced as the master cylinder 12 pressurizes the brake fluid in circuit 22a. However, the drive is isolated from the front wheel brakes 30 and 31 and some action must be taken in circuit 22b or the driver will experience an unusually high, hard brake pedal 14. When the pressure transducer 41 and the brake switch 16 indicate that the driver is applying the brakes during TC or VSM mode, the priming valve 70 remains in the first position 70a and the supply valve 64 is shuttled to the second position 64b. The pressurized fluid from the master cylinder 12 is supplied to the pump inlet 54a and the driver will experience brake pedal movement that is typical to normal base braking. When the MPA switch 69 indicates to the ECU 18 that the MPU 66 is full, the supply valve 64 is returned to the first position 64a.

When VSM mode is entered while the driver is already applying the brakes, the valve control is the same as in VSM without brake pedal apply except that the supply valve 64 is pulsed to the second, open position 64b instead of the priming valve 70. The driver will experience brake pedal movement typical of normal base braking and the pump inlet 54a is supplied with fluid. Further VSM control is similar to the VSM control without brake pedal apply described above. When the driver releases the brake pedal 14, the excess fluid in circuit 22b which was supplied by the master cylinder 12 is pumped back to the master cylinder 12 through the bypass valve 74. Since the master cylinder pressure may be at a relatively high pressure, the bypass valve 74 references atmospheric pressure and opens when the pressure at the pump outlet 54b reaches approximately 2500 p.s.i. above atmospheric pressure.

During a transition from ABS control to VSM control the traction control isolation valve 48 is shuttled to the second position 48b to allow pressures greater than master cylinder pressure to be achieved at the wheel brakes 30 and 31. Fluid may still be stored in the LPA 60 from the previous ABS mode, and this fluid is pumped through the bypass valves 74 and back to the master cylinder 12. Through proper control of the valves and utilizing information from the MPA switch 69, a consistent relationship of pedal travel to brake pressure can be maintained in all modes of operation.

Figure 2:
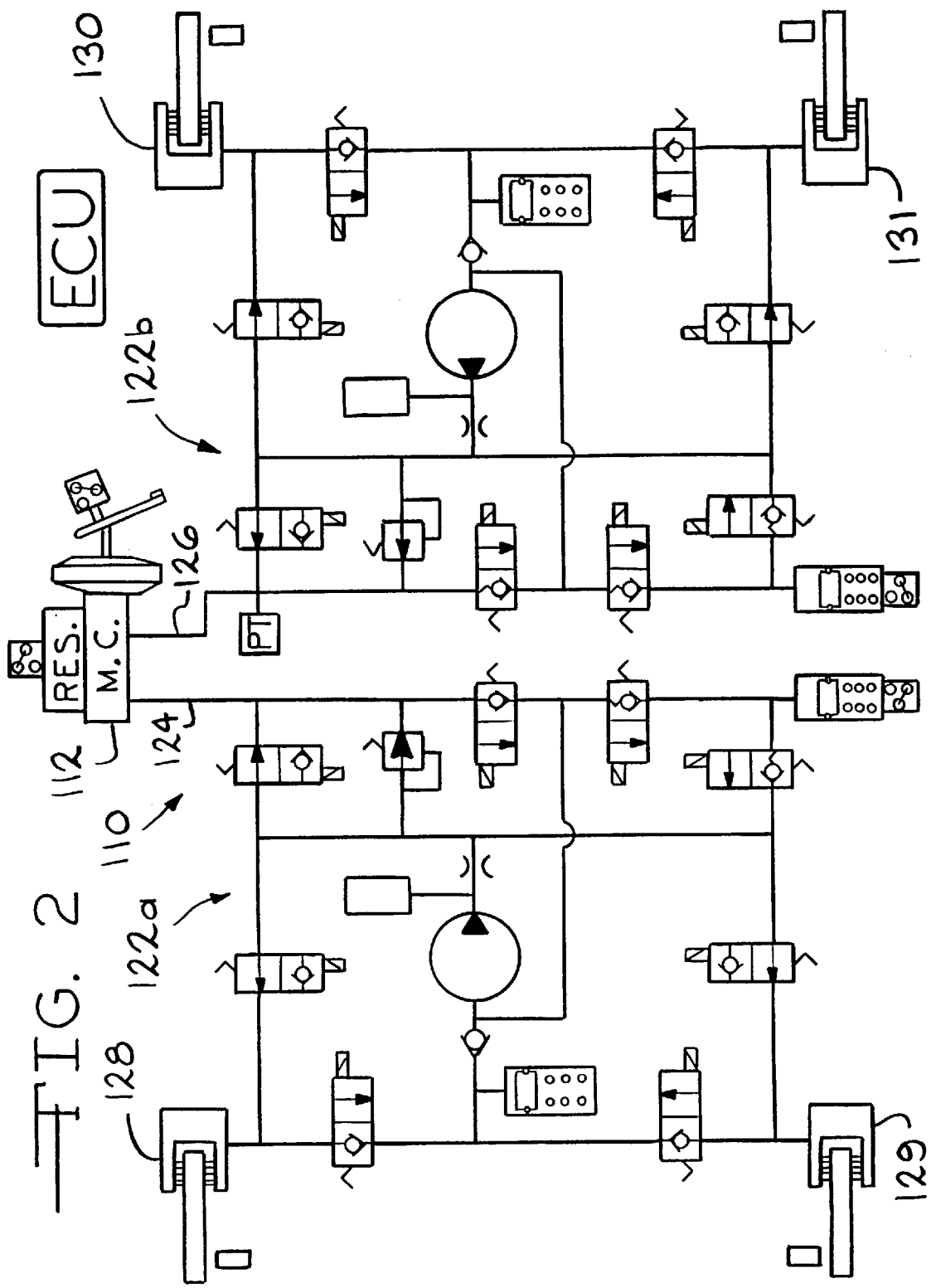
FIG. 2 is a hydraulic circuit schematic of an ABS/TC/VSM brake system with medium pressure accumulators having four channel VSM control in accordance with this invention.

A second embodiment of a brake system according to this invention is indicated generally at 110 in FIG. 2. The brake system 110 includes two similar but separate brake circuits 122a and 122b connected to the master cylinder 112 via respective main conduits 124 and 126. The brake system 110 man be configured as a diagonally split system (not illustrated) with brake circuit 122a including a first driven wheel brake 128 and a first non-driven wheel brake 129, and brake circuit 122b including a second driven wheel brake 130 and a second non-driven wheel brake 131. Alternatively, the brake system 110 may be configured as a vertically split system with brake circuit 122a including first and second non-driven wheel brakes 128 and 129, and brake circuit 122b including first and second driven wheels brakes 130 and 131 as illustrated in FIG. 2.

Both brake circuits 122a and 122b include the same components as circuit 22b of FIG. 1. The brake circuits 122a and 122b also operate in an identical manner as circuit 22b of FIG. 1 to provide selective ABS, traction control and VSM control to all four wheel brakes 128–131 individually.

Referring now to FIG. 3, there is illustrated a medium pressure accumulator indicated generally at 66 according to this invention. The MPA 66 includes a housing 268 having a bore 270. A port 271 intersects the bore 270 and connects with conduit 68 shown in FIG. 1. A cup-shaped end cap 272 is disposed within the bore 270 and secured by a snap ring 285. The cup-shaped end cap 272 includes an annular rim surface 273 which extends into the bore 270. The end cap 272 includes a seal 274 to sealingly enclose the bore 270 to keep out contaminants. A cup-shaped piston 276 is slidably disposed within the bore 270 and includes an annular rim 277 which extends into the bore 270. A seal 278 is disposed within a groove 279 in the outer surface of the piston 276. A pressure chamber 280 is defined between the sealed piston 276 and port 271. A cylinder piston extension 281 having a shoulder 282 is disposed within the cup-shaped piston. A spring 284 is disposed between the piston 276 and the end cap 271. The spring 284 abuts the shoulder 282 of the extension 281 and biases the extension 281 against the piston 276 and also biases the piston 276 towards the port 271. A switch 269 is mounted to the end cap 272 and includes an extension 286 which extends into the bore 270 and past the end cap.

The MPA 66 stores pressurized fluid in the pressure chamber 280. Fluid entering the pressure chamber 280 from port 271 pushes the piston 276 upwards towards the end cap 272 and expands the pressure chamber 280. The spring 284 exerts a force against the piston 276 which pressurizes the fluid in the pressure chamber 280. When the MPA 66 begins to fill, the fluid pressure in the pressure chamber 280 is approximately 40 p.s.i. When the MPA 66 is full, the piston 276 contacts the end cap 272 and the annular rim 277 of the piston 276 abuts the annular rim 273 of the end cap 272. Also, the extension 281 abuts the switch extension 286 which trips the switch 269 indicating that the MPA 66 is full. When the MPA 66 is full, the fluid pressure in the pressure chamber 280 is approximately 400 p.s.i. When fluid exists the pressure chamber 280, the piston 276 moves downwardly and the piston extension 281 no longer contacts the switch extension 286 and the switch 269 indicates that the MPA 66 is no longer full.

Referring now to FIG. 4, there is illustrated the bypass valve indicated generally at 74 according to the invention. The bypass valve 74 includes a housing 302 having a bore 304. A first port 306 connected with conduit 43 intersects the bore 304, and a second port 308 connected with conduit 62 intersects the bore 304. A filter, preferably a cigar band-type filter 307, is disposed at the first port 306. A sleeve 310 is disposed within the bore 304 and secured therein by a snap ring 312. A first sleeve seal 314 is disposed between the outer surface of the sleeve 310 and the bore 304 to prevent fluid flow between the first and second ports 306 and 308. The first sleeve seal 314 is preferably a lip seal which may allow some fluid flow from the second port 308 to the first port 306 but not in the opposite direction; however, other known seals may be used. A second sleeve seal 316 is disposed between the outer surface of the sleeve 310 and the bore 304 to prevent fluid flow between the first port 306 and the atmosphere. The sleeve 310 includes a coaxial bore 318 having a first sleeve shoulder 320 and a second sleeve shoulder 322. A radial bore 324 intersects the sleeve coaxial bore 318 providing fluid communication between the first port 306 and the coaxial bore 318. An end piece 326 is disposed in the bore 304 and retained therein by a swage 328 formed on the sleeve 310. A seal 330 is disposed in a groove 332 formed on the outer surface of the end piece 326. The end piece 326 includes a coaxial bore 334 having a valve seat 336. An optional orifice 337 is disposed beneath the valve seat 336 which improves the contamination resistance of the valve by creating greater valve lift. An optional filter 338 is disposed in the end piece coaxial bore 334.

A poppet 340 is slidably disposed within the sleeve coaxial bore 318 coaxial to the end piece 326. The poppet 340 includes a first end 342 having a shoulder 344 and a coaxial bore 346. A check element, such as a ball 347, is disposed in the poppet bore 346 for seating against the valve seat 336. The poppet 340 further includes a second end 348 which is sealed by seal 350 abutting the second sleeve shoulder 322 to prevent fluid flowing from the sleeve coaxial bore 318 to the atmosphere. An annular washer 352 is disposed against the first sleeve shoulder 320 and a spring 354 is disposed between the washer 352 and the poppet shoulder 344. The spring 354 biases the poppet 340 towards the end piece 326 so that the ball 347 seats against the valve seat 336 and closes fluid communication between the first and second ports 306 and 308.

When the fluid pressure at port 306 and inside the sleeve bore 318 reaches a predetermined pressure, the poppet 340 is pushed upward and the ball 347 moves off the valve seat to allow fluid to flow through the bypass valve 74 from port 306 to port 308. The fluid pressure require to lift the poppet 340 and open the bypass valve 74 is preferably approximately 2500 p.s.i., but may be any suitable pressure. The poppet seal 350 allows the poppet 340 to be referenced to atmosphere so that the fluid pressure required lift the poppet 340 is measured relative to atmospheric pressure.

In accordance with the provisions of the patent statutes, the principal and mode of operation of this invention have been described and illustrated in its preferred embodiments. However, it must be understood that this invention may be practiced otherwise than as specifically explained and illustrated without departing from its spirit or scope.

What is claimed is:

1. A vehicular brake system comprising:
   a master cylinder for pressurizing brake fluid;
   a plurality of wheel brakes in fluid communication with the master cylinder via fluid conduit;
   a pump for pressurizing fluid in the fluid conduit;
   a medium pressure accumulator for storing pressurized fluid;
   a priming valve located between a pump inlet and the medium pressure accumulator for regulating the flow of pressurized fluid from the medium pressure accumulator to the pump inlet; and
   a charging valve located between a pump outlet and the medium pressure accumulator for allowing pressurized fluid to flow into the medium pressure accumulator, wherein the charging valve is a two-position solenoid actuated valve having a first, one-way position in which a check valve prevents fluid from flowing from the medium pressure accumulator to the wheel brakes but allows fluid flow in the opposite direction at a predetermined pressure differential and a second, open position allowing fluid flow in both directions.

2. The vehicular brake system defined in claim 1 wherein the medium pressure accumulator includes a switch to indicate fluid stored therein.

3. The vehicular brake system defined in claim 1 wherein the priming valve includes a two position valve having a first, one-way position in which a check valve prevents fluid from flow from the master cylinder to the medium pressure accumulator but allow fluid flow in the opposite direction at a predetermined pressure differential and a second, open position allowing fluid flow in both directions.

4. The vehicular brake system defined in claim 1 wherein the medium pressure accumulator includes:
   a housing having a bore;
   an end cap disposed in the housing to sealingly enclose the bore;
   a switch mounted in the end cap and extending into the bore;
   a piston slidably disposed within the bore having an extension for contacting the switch when the accumulator is filled with fluid.

5. The vehicular brake system defined in claim 1 including a bypass valve connected between the pump outlet and the priming valve for preventing excessive pressure buildup in the fluid conduit.

6. The vehicular brake system defined in claim 5 wherein the bypass valve includes:
   a housing having a bore;
   a piston slidably disposed within the bore having a valve check member;
   a seal for sealing against the piston to allow the piston to be referenced to atmospheric pressure;
   an end piece disposed within the bore having a valve seat; and
   a spring for biasing the piston towards the end piece and the valve check member against the valve seat to close the bypass valve, wherein the piston is moved away from the end piece thereby moving the valve check member away from the valve seat to open the valve by pressurized fluid having a predetermined pressure with reference to atmospheric pressure.

7. A vehicular brake system comprising:
   a master cylinder for pressurizing brake fluid;
   a plurality of wheel brakes in fluid communication with the master cylinder via fluid conduit;
   a pump for pressurizing fluid in the fluid conduit;
   a medium pressure accumulator for storing pressurized fluid, wherein the medium pressure accumulator includes a housing having a bore, an end cap disposed in the housing to sealingly enclose the bore, a switch mounted in the end cap and extending into the bore, and a piston slidably disposed within the bore having an extension for contacting the switch when the accumulator is filled with fluid;
   a priming valve located between a pump inlet and the medium pressure accumulator for regulating the flow or pressurized fluid from the medium pressure accumulator to the pump inlet; and
   a charging valve located between a pump outlet and the medium pressure accumulator for allowing pressurized fluid to flow into the medium pressure accumulator, wherein the charging valve is a solenoid actuated valve.

8. A vehicular brake system comprising:
   a master cylinder for pressurizing brake fluid;
   a plurality of wheel brakes in fluid communication with the master cylinder via fluid conduit;
   a pump for pressurizing fluid in the fluid conduit;
   a medium pressure accumulator for storing pressure fluid;
   a priming valve located between a pump inlet and the medium pressure accumulator for regulating the flow of pressurized fluid from the medium pressure accumulator to the pump inlet;
   a charging valve located between a pump outlet and the medium pressure accumulator for allowing pressurized fluid to flow into the medium pressure accumulator; wherein the charging valve is a solenoid actuated valve; and
   a bypass valve connected between the pump outlet and the priming valve for preventing excessive pressure buildup in the fluid conduit, wherein the bypass valve includes a housing having a bore, a piston slidably disposed within the bore having a valve check member, a seal for sealing against the piston to allow the piston to be referenced to atmospheric pressure, an end piece disposed within the bore having a valve seat, and a spring for biasing the piston towards the end piece and the valve check member against the valve seat to close the bypass valve, wherein the piston is moved away from the end piece thereby moving the valve check member away from the valve seat to open the valve by pressurized fluid having a predetermined pressure with reference to atmospheric pressure.

* * * * *

UNITED STATES PATENT AND TRADEMARK OFFICE
CERTIFICATE OF CORRECTION

PATENT NO. : 6,217,129 B1
DATED : April 17, 2001
INVENTOR(S) : Blaise J. Ganzel

Page 1 of 1

It is certified that error appears in the above-identified patent and that said Letters Patent is hereby corrected as shown below:

Column 10, claim 7,
Line 15, delete "or" and insert -- of --.

Column 10, claim 8,
Line 6, delete "pressure" and insert -- pressurized --.

Signed and Sealed this

Fifteenth Day of January, 2002

Attest:

JAMES E. ROGAN
Director of the United States Patent and Trademark Office

Attesting Officer